United States Patent
Clemens et al.

(10) Patent No.: US 8,550,192 B2
(45) Date of Patent: Oct. 8, 2013

(54) PAYLOAD MODULE FOR MOBILITY ASSIST

(75) Inventors: David A. Clemens, Orange, CA (US);
John C. Dunne, Costa Mesa, CA (US);
Michael S. Beck, Colleyville, TX (US);
Wendell H. Chun, Littleton, CO (US);
Jon T. Stinchcomb, Arlington, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 991 days.

(21) Appl. No.: 12/207,210

(22) Filed: Sep. 9, 2008

(65) Prior Publication Data
US 2009/0033045 A1 Feb. 5, 2009

Related U.S. Application Data

(63) Continuation of application No. 10/639,261, filed on Aug. 12, 2003, now Pat. No. 7,464,775.

(60) Provisional application No. 60/449,271, filed on Feb. 21, 2003.

(51) Int. Cl.
*B62D 51/06* (2006.01)

(52) U.S. Cl.
USPC .............. 180/8.3; 180/8.1; 180/8.4; 901/15

(58) Field of Classification Search
USPC .................. 180/8.1, 8.3, 8.4, 8.5, 8.6, 9.32; 414/694; 901/1, 15
See application file for complete search history.

(56) References Cited

U.S. PATENT DOCUMENTS

| | | | |
|---|---|---|---|
| 1,041,837 A | 10/1912 | Miks | 180/8.3 |
| 1,202,203 A | 10/1916 | Moench | 180/8.4 |
| 1,567,684 A | 12/1925 | Srakula | 180/8.4 |
| 1,783,995 A | 12/1925 | Berg | 180/24.07 |
| 2,748,879 A | 6/1956 | Bailey | 180/24.07 |
| 3,145,796 A | 8/1964 | Padula | 180/8.4 |
| 3,167,147 A | 1/1965 | Symons et al. | 180/235 |
| 3,397,896 A | 8/1968 | Willetts | 280/677 |
| 3,409,100 A | 11/1968 | Kronqvist | 180/6.54 |
| 3,513,927 A | 5/1970 | Kozowyk et al. | 180/41 |
| 3,566,825 A | 3/1971 | Ruf | 115/1 |
| 3,584,892 A | 6/1971 | Moore | 280/104 |
| 3,649,981 A | 3/1972 | Woodworth | 15/83 |
| 3,666,036 A | 5/1972 | Scerbo | |
| 3,730,287 A | 5/1973 | Fletcher et al. | |

(Continued)

FOREIGN PATENT DOCUMENTS

| | | |
|---|---|---|
| CH | 295 771 | 3/1954 |
| EP | 872665 | 10/1998 |

(Continued)

OTHER PUBLICATIONS

U.S. Appl. No. 60/449,271, filed Feb. 21, 2003, Michael Beck.

(Continued)

*Primary Examiner* — Kevin Hurley
*Assistant Examiner* — Marc A Scharich
(74) *Attorney, Agent, or Firm* — Withrow & Terranova, PLLC

(57) ABSTRACT

A ground vehicle and a method for articulating a payload module for mobility assist are disclosed. The ground vehicle comprises a chassis; and a payload module capable of articulating relative to the chassis to assist the mobility of the ground vehicle. The method comprises articulating a payload module relative to a chassis.

3 Claims, 11 Drawing Sheets

(56) References Cited

U.S. PATENT DOCUMENTS

| | | | |
|---|---|---|---|
| 3,806,141 A | 4/1974 | Janer | 280/6.156 |
| 3,842,926 A | 10/1974 | Williams et al. | 180/8.6 |
| 4,021,690 A | 5/1977 | Burton | 310/67 R |
| 4,049,070 A | 9/1977 | Soyland | 180/8.5 |
| 4,056,158 A | 11/1977 | Ross | 180/6.48 |
| 4,162,713 A | 7/1979 | Heitman et al. | 180/242 |
| 4,176,726 A | 12/1979 | Schaeff | 180/15 |
| 4,291,779 A | 9/1981 | Mann et al. | 180/305 |
| 4,313,511 A | 2/1982 | Soo Hoo | 180/21 |
| 4,334,590 A | 6/1982 | Plumb | 180/247 |
| 4,342,278 A | 8/1982 | Horan | 114/345 |
| 4,491,207 A | 1/1985 | Boonchanta et al. | 188/299 |
| 4,555,126 A | 11/1985 | Ishimitsu et al. | |
| 4,600,069 A | 7/1986 | Oswald et al. | 180/24.02 |
| 4,702,843 A | 10/1987 | Oswald et al. | 280/5.507 |
| 4,709,265 A | 11/1987 | Silverman et al. | 348/158 |
| 4,720,120 A | 1/1988 | Shimatani et al. | 280/124.109 |
| 4,721,177 A | 1/1988 | Qizhen | 180/205 |
| 4,721,328 A | 1/1988 | Chauveau et al. | 280/124.129 |
| 4,771,848 A | 9/1988 | Namba et al. | 180/197 |
| 4,799,564 A | 1/1989 | Iijima et al. | 180/65.5 |
| 4,805,102 A | 2/1989 | Ise et al. | 701/37 |
| 4,836,342 A | 6/1989 | Wolfe | 188/319 |
| 4,898,257 A | 2/1990 | Brandstadter | 180/9.1 |
| 4,921,272 A | 5/1990 | Ivers | 280/707 |
| 4,957,307 A | 9/1990 | Gandiglio | 280/124.141 |
| 4,977,971 A | 12/1990 | Crane, III et al. | 180/8.3 |
| 4,994,970 A | 2/1991 | Noji et al. | 701/25 |
| 5,005,658 A | 4/1991 | Bares et al. | 180/8.1 |
| 5,014,800 A | 5/1991 | Kawamoto et al. | 180/65.5 |
| 5,022,812 A | 6/1991 | Coughlan et al. | 414/729 |
| 5,033,573 A | 7/1991 | Hrovat | 180/197 |
| 5,037,125 A | 8/1991 | Zamitter et al. | 280/686 |
| 5,076,378 A | 12/1991 | Lagace | 180/9.1 |
| 5,087,229 A | 2/1992 | Hewko et al. | 475/149 |
| 5,137,101 A | 8/1992 | Schaeff | 180/8.1 |
| 5,180,180 A | 1/1993 | Yamashita et al. | 180/253 |
| 5,201,836 A | 4/1993 | DeWitt | 280/426 |
| 5,203,646 A | 4/1993 | Landsberger et al. | 405/191 |
| 5,248,008 A | 9/1993 | Clar | 180/9.32 |
| 5,276,623 A | 1/1994 | Wolfe | 364/424.05 |
| 5,277,281 A | 1/1994 | Carlson et al. | 188/267 |
| 5,316,100 A | 5/1994 | Juan | 180/167 |
| 5,350,033 A | 9/1994 | Kraft | 180/167 |
| 5,372,211 A | 12/1994 | Wilcox et al. | |
| 5,382,854 A | 1/1995 | Kawamoto et al. | 310/67 R |
| 5,405,181 A | 4/1995 | Watkins et al. | 298/17 B |
| 5,440,916 A | 8/1995 | Stone et al. | 73/23.31 |
| 5,443,354 A | 8/1995 | Stone et al. | 414/729 |
| 5,451,135 A | 9/1995 | Schempf et al. | 414/694 |
| 5,474,504 A | 12/1995 | Bay et al. | 475/274 |
| 5,515,934 A | 5/1996 | Davis | 180/8.2 |
| 5,517,414 A | 5/1996 | Hrovat | 701/91 |
| 5,519,611 A | 5/1996 | Tagawa et al. | |
| 5,525,115 A | 6/1996 | Vanzini | 475/146 |
| 5,528,978 A | 6/1996 | Forster | 92/140 |
| 5,549,837 A | 8/1996 | Ginder et al. | 252/62.52 |
| 5,581,136 A | 12/1996 | Li | 310/67 F |
| 5,652,704 A | 7/1997 | Catanzarite | 364/424.059 |
| 5,672,044 A | 9/1997 | Lemelson | 414/744.3 |
| 5,693,004 A | 12/1997 | Carlson et al. | 601/23 |
| 5,711,746 A | 1/1998 | Carlson | 482/112 |
| 5,733,218 A | 3/1998 | Sudau et al. | 475/347 |
| 5,762,407 A | 6/1998 | Stacey et al. | 303/155 |
| 5,762,466 A | 6/1998 | Fraser | 414/680 |
| 5,816,372 A | 10/1998 | Carlson et al. | 188/267.2 |
| 5,819,870 A | 10/1998 | Braun | 180/305 |
| 5,823,309 A | 10/1998 | Gopalswamy et al. | 192/21.5 |
| 5,842,547 A | 12/1998 | Carlson et al. | 188/267 |
| 5,845,753 A | 12/1998 | Bansbach | 192/21.5 |
| 5,896,965 A | 4/1999 | Gopalswamy et al. | 192/21.5 |
| 5,900,184 A | 5/1999 | Weiss et al. | 252/62.52 |
| 5,906,249 A | 5/1999 | Monkkonen | 180/292 |
| 5,947,238 A | 9/1999 | Jolly et al. | 188/267.1 |
| 5,993,358 A | 11/1999 | Gureghian et al. | 482/54 |
| 5,999,868 A | 12/1999 | Beno et al. | 701/37 |
| 6,010,139 A | 1/2000 | Heyring et al. | 280/124.104 |
| 6,092,011 A | 7/2000 | Hiramoto | 701/37 |
| 6,095,295 A | 8/2000 | Park et al. | 188/267.2 |
| 6,095,486 A | 8/2000 | Ivers et al. | 251/129.01 |
| 6,112,843 A | 9/2000 | Wilcox et al. | 180/34 |
| 6,113,343 A | 9/2000 | Goldenberg et al. | 414/729 |
| 6,123,027 A | 9/2000 | Suyama et al. | |
| 6,131,709 A | 10/2000 | Jolly et al. | 188/267.2 |
| 6,151,930 A | 11/2000 | Carlson | 68/12.06 |
| 6,157,879 A | 12/2000 | Kwack et al. | 701/37 |
| 6,161,639 A | 12/2000 | Jones | 180/8.4 |
| 6,199,654 B1 | 3/2001 | Kojo et al. | 180/443 |
| 6,208,920 B1 | 3/2001 | Izawa et al. | 701/36 |
| 6,267,196 B1 | 7/2001 | Wilcox et al. | 180/347 |
| 6,276,475 B1 | 8/2001 | Nakanosono | 180/65.8 |
| 6,293,561 B1 | 9/2001 | Goetzen et al. | 280/5.52 |
| 6,293,562 B1 | 9/2001 | Kutscher | 280/6.159 |
| 6,318,522 B1 | 11/2001 | Johnston et al. | 188/267.2 |
| 6,360,148 B1 | 3/2002 | Halpin | 701/37 |
| 6,481,806 B1 | 11/2002 | Krueger et al. | 303/140 |
| 6,526,342 B1 | 2/2003 | Burdock et al. | 701/37 |
| 6,585,066 B1 | 7/2003 | Koneda et al. | 180/65.2 |
| 6,607,049 B2 | 8/2003 | Cigal | 180/305 |
| 6,622,074 B1 | 9/2003 | Coelingh et al. | 701/48 |
| 6,711,482 B2 | 3/2004 | Shiino et al. | 701/37 |
| 6,722,459 B1 | 4/2004 | Wendl et al. | 180/65.5 |
| 6,804,594 B1 | 10/2004 | Chen et al. | 701/42 |
| 6,816,753 B2 | 11/2004 | Sakamoto et al. | 700/245 |
| 6,816,764 B2 | 11/2004 | Coelingh et al. | 701/37 |
| 6,852,061 B2 | 2/2005 | Schoon | 475/348 |
| 6,859,702 B2 | 2/2005 | Kawashima et al. | 701/37 |
| 6,866,465 B2 | 3/2005 | Jester et al. | 414/556 |
| 6,942,049 B2 | 9/2005 | Shimizu | 180/65.6 |
| 7,150,340 B2 | 12/2006 | Beck et al. | 180/242 |
| 7,464,775 B2 * | 12/2008 | Clemens et al. | 180/8.3 |
| 2002/0084599 A1 | 7/2002 | Charaudeau et al. | 280/5.5 |
| 2003/0001734 A1 | 1/2003 | Schofield et al. | 340/442 |
| 2003/0033063 A1 | 2/2003 | Kawashima et al. | 701/37 |
| 2003/0125859 A1 | 7/2003 | Dix et al. | 701/50 |
| 2003/0150663 A1 | 8/2003 | Farbotnik et al. | 180/312 |
| 2003/0205424 A1 | 11/2003 | Felsing et al. | 180/242 |
| 2004/0046335 A1 | 3/2004 | Knox et al. | |
| 2004/0109750 A1 | 6/2004 | Klassen | 414/680 |
| 2004/0163863 A1 | 8/2004 | Beck et al. | 182/242 |
| 2004/0163869 A1 | 8/2004 | Chun et al. | 180/209 |
| 2004/0164505 A1 | 8/2004 | Clemens et al. | 180/8.3 |
| 2004/0167682 A1 | 8/2004 | Beck et al. | 701/3 |
| 2004/0231904 A1 | 11/2004 | Beck et al. | 180/268 |
| 2004/0232632 A1 | 11/2004 | Beck et al. | 280/5.5 |
| 2004/0239055 A1 | 12/2004 | Bender | |
| 2005/0145428 A1 | 7/2005 | Chun et al. | 180/209 |
| 2006/0082077 A1 | 4/2006 | Gouriet et al. | |
| 2006/0138732 A1 | 6/2006 | Buma et al. | 280/5.5 |
| 2007/0040341 A1 | 2/2007 | Kaloust et al. | 180/6.2 |
| 2007/0080001 A1 | 4/2007 | Beck et al. | 280/6.155 |
| 2007/0084664 A1 | 4/2007 | Beck et al. | 180/65.5 |
| 2009/0020351 A1 | 1/2009 | Chun et al. | 180/209 |
| 2009/0033045 A1 | 2/2009 | Clemens et al. | 180/8.3 |

FOREIGN PATENT DOCUMENTS

| | | |
|---|---|---|
| GB | 2382638 | 6/2003 |
| JP | 62251220 | 11/1987 |
| JP | 2262484 | 10/1990 |
| JP | 8169345 | 7/1996 |
| WO | WO 94/01181 | 1/1994 |
| WO | WO 01/53145 A1 | 7/2001 |
| WO | WO 2005/039956 A3 | 5/2005 |

OTHER PUBLICATIONS

U.S. Appl. No. 10/639,261, filed Aug. 12, 2003, Clemens, David.
Restriction Requirement dated Sep. 23, 2004 for U.S. Appl. No. 10/639,261.
Office Action dated Dec. 16, 2004 for U.S. Appl. No. 10/639,261.
Office Action dated May 13, 2005 for U.S. Appl. No. 10/639,261.
Office Action dated Oct. 4, 2005 for U.S. Appl. No. 10/639,261.
Office Action dated Jun. 9, 2006 for U.S. Appl. No. 10/639,261.

(56) References Cited

OTHER PUBLICATIONS

Final Office Action dated Nov. 17, 2006 for U.S. Appl. No. 10/639,261.
Office Action dated Jun. 22, 2007 for U.S. Appl. No. 10/639,261.
Final Office Action dated Jul. 8, 2008 for U.S. Appl. No. 10/639,261.
Notice of Allowance dated Sep. 18, 2008 for U.S. Appl. No. 10/639,261.
U.S. Appl. No. 60/449,271, filed Feb. 2003, Michael Beck.
May 7, 2004 International Search Report (PCT/US/03/38918).
Jun. 27, 2005 PCT Search Report.
May 4, 2007 Non-Final Rejection for U.S. Appl. No. 10/784,341.
Oct. 24, 2007 Non-Final Rejection for U.S. Appl. No. 10/784,341.
Mar. 25, 2008 Non-Final Rejection for U.S. Appl. No. 10/784,341.
Mar. 31, 2008 Supplemental Non-Final Rejection for U.S. Appl. No. 10/784,341.
Dec. 2, 2008 Final Rejection for U.S. Appl. No. 10/784,341.
Feb. 26, 2009 Advisory Action for U.S. Appl. No. 10/784,341.
Apr. 6, 2009 Pre-Brief Appeal Conference Decision for U.S. Appl. No. 10/784,341.
May 30, 2006 Requirement for Election/Restriction for U.S. Appl. No. 10/784,739.
Aug. 15, 2006 Non-Final Rejection for U.S. Appl. No. 10/784,739.
Mar. 15, 2007 Final Rejection for U.S. Appl. No. 10/784,739.
May 25, 2007 Advisory Action for U.S. Appl. No. 10/784,739.
Jul. 9, 2007 Non-Final Rejection for U.S. Appl. No. 10/784,739.
Feb. 11, 2008 Final Rejection for U.S. Appl. No. 10/784,739.
Apr. 22, 2008 Advisory Action for U.S. Appl. No. 10/784,739.
May 19, 2008 Advisory Action for U.S. Appl. No. 10/784,739.
Dec. 8, 2008 Examiner's Answer to Appeal Brief for U.S. Appl. No. 10/784,739.
May 6, 2009 Appeal Docketing Notice for U.S. Appl. No. 10/784,739.
Dec. 30, 2008 Requirement for Election/Restricion for U.S. Appl. No. 11/530,129.
Mar. 31, 2009 Non-Final Rejection for U.S. Appl. No. 11/530,129.
Sep. 14, 2007 Non-Final Rejection for U.S. Appl. No. 11/609,517.
Apr. 2, 2008 Final Rejection for U.S. Appl. No. 11/609,517.
Sep. 15, 2008 Notice of Defective Appeal Brief for U.S. Appl. No. 11/609,517.
Jan. 12, 2009 Examiner's Answer to Appeal Brief for U.S. Appl. No. 11/609,517.
Jun. 12, 2009 Order Returning Undocketed Appeal to examiner from BPAI for U.S. Appl. No. 11/609,517.
Feb. 6, 2009 Non-Final Rejection for U.S. Appl. No. 11/559,988.
Feb. 26, 2009 Non Final Rejection for U.S. Appl. No. 12/180,905.
Apr. 28, 2009 Non-Final Rejection for U.S. Appl. No. 12/207,210.
Non-final Office Action for U.S. Appl. No. 11/530,129 mailed Aug. 7, 2013, 6 pages.

\* cited by examiner

PAYLOAD MODULE FOR MOBILITY ASSIST

This is a continuation of U.S. application Ser. No. 10/639,261, entitled "Payload Module For Mobility Assist", filed Aug. 12, 2003 now U.S. Pat. No. 7,464,775, in the name of the inventors David A Clemens, John C Dunne, Michael S Beck, Wendell H Chun, and Jon T Stinchcomb ("the '261 application"). The '261 application claimed the earlier effective filing date of U.S. Provisional Application Ser. No. 60/449,271, entitled "Unmanned Ground Vehicle," filed Feb. 21, 2003, in the name of Michael S. Beck, et al. ("the '271 application"). The earlier effective filing data of each of the '261 and '271 applications is hereby claimed under 35 U.S.C. §§119, 120. The '261 application is also hereby incorporated by reference as if set forth expressly verbatim herein.

BACKGROUND OF THE INVENTION

1. Field of the Invention

The present invention pertains to ground vehicles and, more particularly, to a payload module for mobility assist for a ground vehicle.

2. Description of the Related Art

Ground vehicles may be designed for use in a wide range of uses in an equally wide range of environments. Uses can typically be divided into transporting people or cargo, although the mechanisms may vary greatly. For instance, a passenger automobile carries passengers differently than a bulldozer moves dirt. The environments can range from improved roadways to rugged, off-road terrain.

The desired handling characteristics for any given ground vehicle are largely defined by its intended use and expected environment. A ground vehicle's actual handling characteristics are determined by a number of factors. The most obvious of these factors is the design and performance of the suspension system. But, in many respects, the vehicle's dimensions and weight distribution are equally important. The dimensions and weight distribution generate a "center of gravity" for the vehicle, i.e., a localized point at which gravity can be considered to act on the vehicle as a whole, on the average.

A vehicle's center of gravity is important to its handling for a variety of reasons. For one thing, a relatively high center of gravity will make a vehicle prone to tipping, even to the point of rolling over, all else being equal. Thus, a design with a high center of gravity will typically counter this tendency by widening the vehicle's wheelbase. Another aspect of center of gravity location becomes more apparent in more rugged environments, especially off-road. Just as a ground vehicle can become stranded in a negative obstacle, e.g., a ditch or a trench, so can a ground vehicle become stranded on a positive obstacle, e.g., a fence, a rock, or a barricade. One particular type of stranding on a positive obstacle is known as "centering," in which one or of the ground vehicle's wheels cannot, or do not, touch the ground.

One way to avoid this type of stranding is simply to avoid encountering a problematical positive obstacle. However, this may not always be possible. For instance, in some military applications, some tactical or strategic consideration might call for a ground vehicle to directly traverse the obstacle. In some circumstances, the ground vehicle may inadvertently encounter the positive obstacle, e.g., the positive obstacle may not be seen in time to avoid it. However, the vehicle becomes stranded, it will generally be desirable to rescue the vehicle. The simplest way is simply to get another vehicle to pull the first free of the obstacle. There may nevertheless be circumstances in which it is undesirable to use a second vehicle for this purpose or where there is no second vehicle suitable or available for this purpose.

The present invention is directed to resolving, or at least reducing, one or all of the problems mentioned above.

SUMMARY OF THE INVENTION

The invention, in its various aspects and embodiments, includes a ground vehicle and a method for articulating a payload module for mobility assist. The ground vehicle comprises a chassis; and a payload module capable of articulating relative to the chassis to assist the mobility of the ground vehicle. The method comprises articulating a payload module relative to a chassis.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
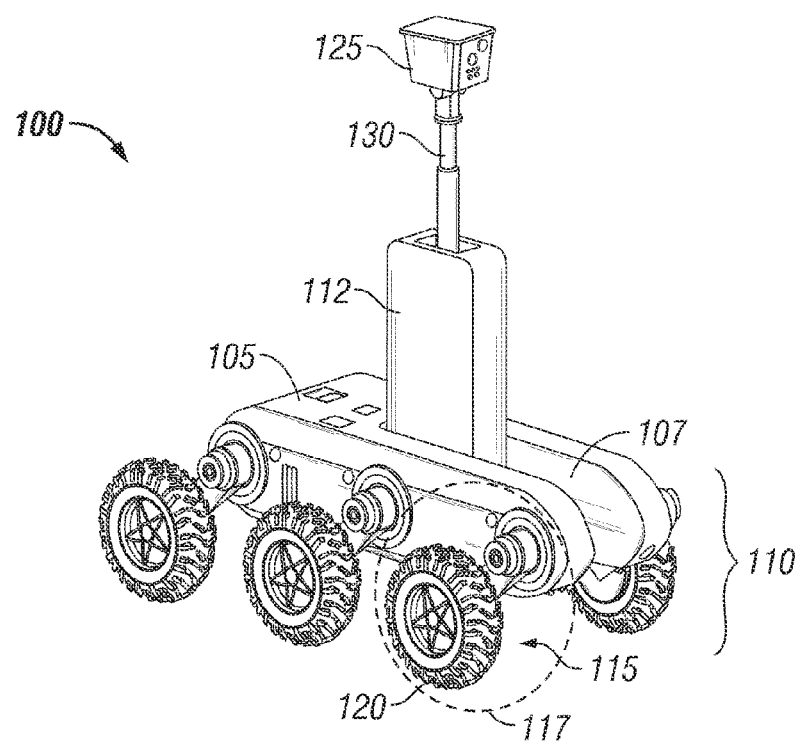
FIG. 1 depicts one particular embodiment of an unmanned ground vehicle in accordance with the present invention.

Turning now to the drawings, FIG. 1 illustrates one particular embodiment of a ground vehicle 100 in accordance with the present invention. In the illustrated embodiment, the ground vehicle 100 is an unmanned ground vehicle ("UGV"). However, this is not material to the practice of the invention. Thus, for the sake of clarity and so as not to obscure the present invention, some aspects of the vehicle 100, e.g., various robotic capabilities, will not be presented. The vehicle 100 comprises:

- a chassis 105 defining a payload bay 107;
- a suspension system 110 for the chassis 105;
- a payload module 112 housed in the payload bay 107 of the chassis 105;
- a drive train 115, a portion of which is located in the wheel assemblies 117 (only one indicated);
- a power plant (not shown in FIG. 1) powering the wheels 120 (only one indicated) of the drive train 115 through the suspension system 110 and the drive train;
- a control system (also not shown in FIG. 1) capable of controlling the operation of the suspension system 110, the power plant, and the payload module 112.

Those in the art having the benefit of this disclosure will recognize that many aspects of the illustrated embodiment will be implementation specific. For instance, some embodiments may be tracked instead of wheeled, or have different numbers of wheels.

The payload module 112 of the illustrated embodiment includes a sensor package 125 mounted atop telescoping mast 130. The mast 130 is shown fully extended in FIG. 1. In the illustrated embodiment, the payload module 112 articulates from the payload bay 107. The payload bay 107 is defined by a pair of "sponsons," or tines, that comprise a portion of the chassis 105. Thus, the payload bay 107 permits articulation above and below the chassis 105. However, this is not necessary to the practice of the invention. The payload bay in alternative embodiments may be, for instance, an opening in the bottom of the chassis that permits articulation only below the chassis 105.

Figure 2A:
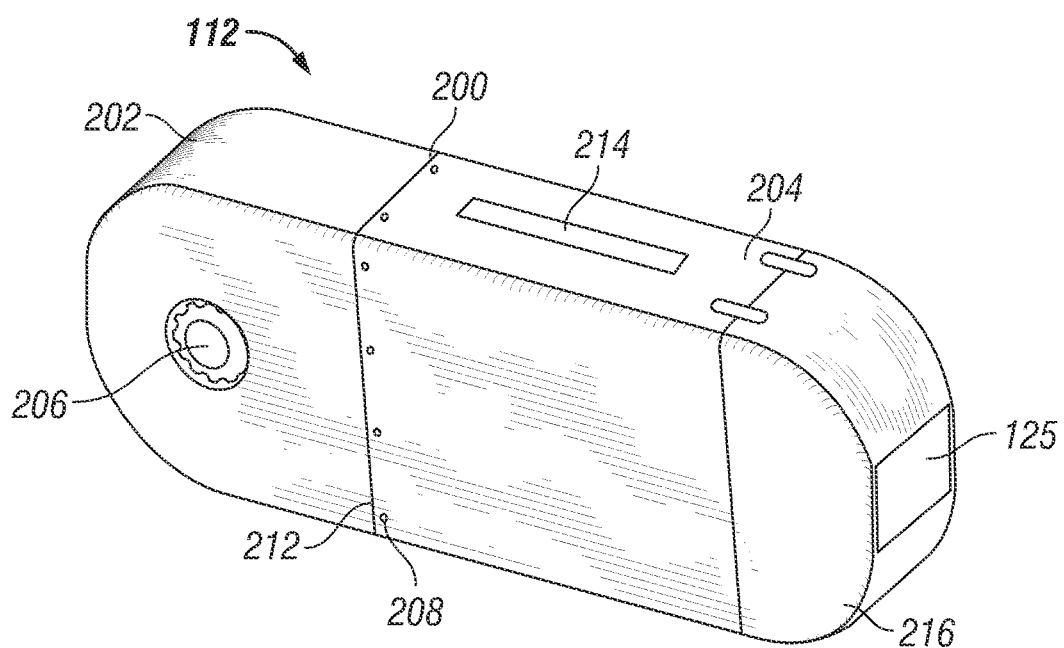
FIG. 2A and FIG. 2B illustrate, in an unsectioned and a sectioned view, respectively, the payload module of the embodiment first shown in FIG. 1.
Figure 2B:
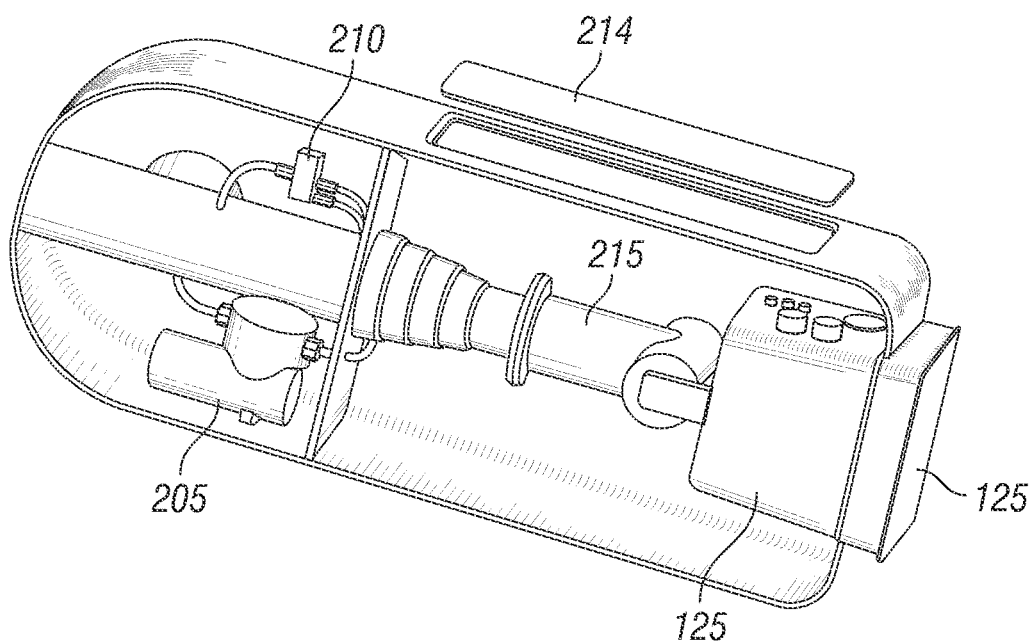

The payload module 112 is better shown in FIG. 2A and FIG. 2B in an unsectioned and a sectioned view, respectively. The mast 130 is shown fully retracted in FIG. 2A and FIG. 2B. The mast 130 and sensor package 125, when retracted, are housed in an enclosure 200. In the illustrated embodiment, the enclosure 200 is fabricated from a composite material similar to a composite material used for the construction of the chassis 105. However, other materials may be used in alternative embodiments.

The enclosure 200 is configurable to accommodate different payloads, i.e., payloads other than the mast 130 and sensor package 125. Referring now to FIG. 2A, the enclosure 200 comprises a base 202 and an extension 204. The base 202 is operably connected to the chassis 105 of the ground vehicle 100 in a manner more fully described below via the aperture 206. The extension 204 is affixed to the base 202 by a plurality of removable fasteners 208 (only one indicated) about the perimeter of the joint 212 between the two. Thus, the enclosure 200 can be configured by switching out the extension 204 for another extension designed to accommodate other payloads. The enclosure 200 may also be configurable through selected design features. For instance, the extension 204 includes a removable plate 214, and may be designed with a hinged cap 216 (as indicated in ghosted lines).

Referring now to FIG. 2B, the mast 130 is powered by compressor/vacuum pump 205 governed by a solenoid valve 210 controlled by the control system (not shown) of the ground vehicle 100. The sensor package 125 is mounted to the mast 130 by a pan/tilt mechanism 215 to provide those capabilities to the sensor package 125. In the illustrated embodiment, the telescoping mast 130 may be a commercially available, pneumatic mast that consists of seven concentric segments ranging in diameter from 5-inches to 2-inches. Total extension capability of this telescoping mast is typically 3 or 4:1. Sensor height will range from ~30" to ~120". Table 1 identifies commercially available parts with which the illustrated embodiment may be implemented.

TABLE 1

One Implementation of the Extendable Mast

| Part | Implementation |
| --- | --- |
| Mast | Will-Burt Custom Telescoping Mast-5 sections, 7.62 cm (3") diameter tubes, 11.5 cm (43.5") extension |
| Solenoid Valve | Humphrey 410 Solenoid Valve |
| Pan/Tilt Mechanism | ROS PT-25 Pan/Tilt, 45.5 Kg (100 lb.) capacity, 5.9 Kg (13 lb.) weight |
| Compress/Vacuum Pump | Thomas 907DC Compressor/Vacuum Pump, 0.72 CFM @ 20 psi, 1/10 hp, 2.95 Kg (6.5 lbs.) weight |

The tubes 220 of the mast 130 are pressurized to 15 psi using a small compressor 205. The vacuum function of the compressor 205 is used to retract the mast 130. A tensioning cable (not shown) acts as a constant force spring on the sensor package 125. This provides benefits for stiffening the mast 130 at intermediate stops, "averaging" the stiction loads during deployment, enabling accurate variable stops, and aids in retracting the mast 130 through the use of an electric motor/winch/drum (not shown) that is used to control the tension/spooling of the cable. Variable stops can be achieved through freezing the drum at the desired locations using sensory feedback (drum encoder, string potentiometer or infrared/ultrasonic sensor, none shown).

Figure 3A:
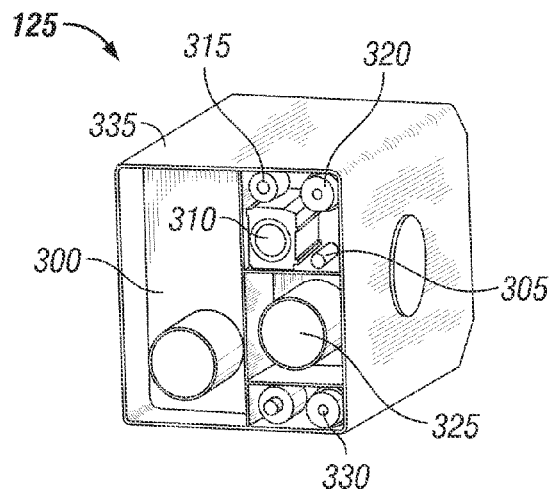
FIG. 3A-FIG. 3B illustrate the content of the sensor package of the payload module of FIG. 2A-FIG. 2B in assembled and unassembled views, respectively.
Figure 4:
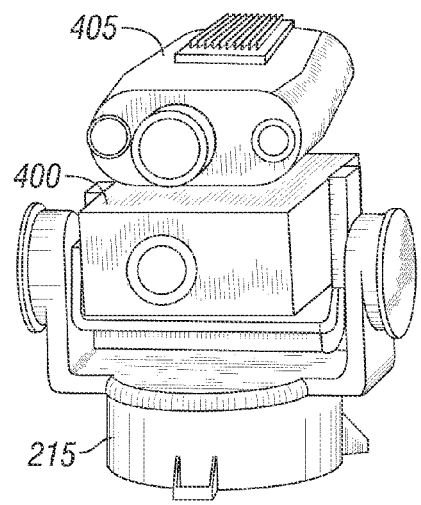
FIG. 4 depicts a sensor package alternative to that illustrated in FIG. 3A-FIG. 3B.
Figure 3B:
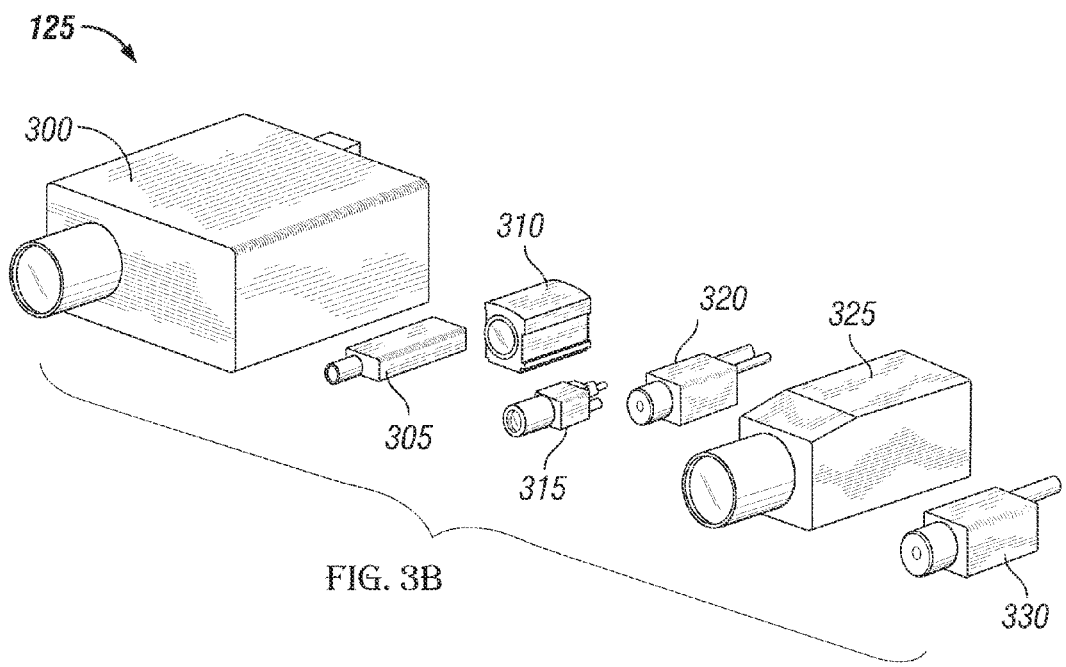

FIG. 3A-FIG. 3B illustrate the content of the sensor package 125 in assembled and unassembled views, respectively. The sensor package 125, in the illustrated embodiment, includes:

- a scannerless range imagine LADAR ("SRI") LADAR sensor 300;
- a laser aimer/pointer 305;
- a video camera 310 with zoom;
- a fixed video camera 315;
- a forward-looking infrared ("FLIR") sensor 320 with a short lens for use in driving the ground vehicle 100;
- a shortwave infrared ("SWIR") sensor 325; and
- a forward-looking infrared ("FLIR") sensor 330 with a long lens for use in observation;

in a housing 335, shown only in FIG. 3A. Some embodiments may also include, for instance, an acoustic sensor 340 with or without a hearing aid microphone 345, both shown only in FIG. 3B. However, other sensors may be used in addition to, or in lieu of those listed above in alternative embodiments. One such embodiment is shown in FIG. 4, in which a sensor package 125a includes a designator 400 and a locator 405. Indeed, some embodiments may omit the sensor package 125 altogether. Table 2 identifies commercially available sensors with which the illustrated embodiment may be implemented.

TABLE 2

Sensor Payloads

| Sensor | Implementation |
| --- | --- |
| SWIR | Indigo Merlin NIR w/50 MM Fixed |
| FLIR-Long Lens for observation | Indigo Alpha |
| Target Designator | Litton - LLDR |
| Daylight Cameras for Driving | Watec 902S (Stereo), with fixed lens (2×) |
| FLIR-Short Lens for Driving | Indigo Alpha |
| LADAR | SRI Scannerless Range Imaging LADAR |
| Video Camera for Observation | Sony EX470 w/18× zoom |
| Laser Aimer-Pointer | NVEC Model GCP-2A (10 km range) |

Figure 5A:
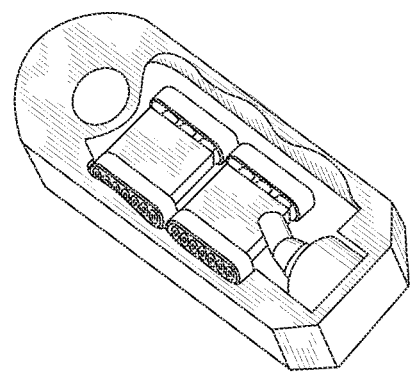
FIG. 5A-FIG. 5C illustrate payloads alternative to the sensor packages shown in FIG. 3A-FIG. 3B, and FIG. 4 for use in the payload module of FIG. 1.
Figure 5B:
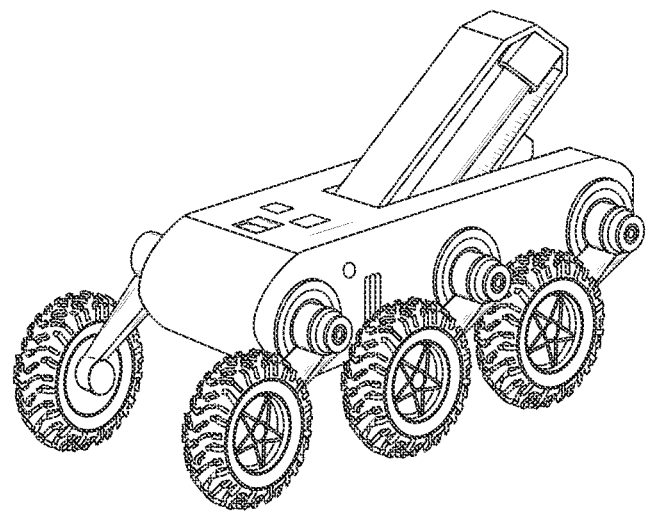
Figure 5C:
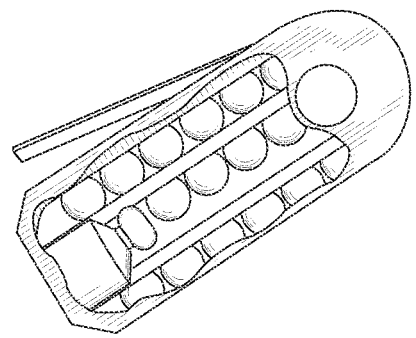

The illustrated embodiment of the ground vehicle 100 is intended for military applications. Thus, the modular payload module 112 provides for mission-specific payload configurations, and notionally houses a telescopic mast and reconnaissance, surveillance and targeting ("RST")/perception/situational awareness sensor array, i.e., the sensor package 125. The modularized payload sensor integration approach embodied by the payload module 112 provides flexibility to exchange and alternate payloads depending upon mission goals. Variability in payloads includes alternate sensor pods, marsupials, Unmanned Ground Sensors ("UGS"), or weapons. Some of these alternative payloads are illustrated in FIG. 5A-FIG. 5C, which illustrate a marsupial robot, a telescoping mast with a sensor pod, and a UGS, respectively The illustrated embodiment also employs a number of standard electronic and mechanical interfaces facilitating modularity in payload design. The concept is analogous to the plug and play architecture for PC's and the use of docking stations to interface laptops with other components. The strategy is to design interfaces that ensure quick interchangeability in the field among various payloads, such as those shown in FIG. 5A-FIG. 5C. However, this is not necessary to the practice of the invention.

Thus, the vehicle 100 includes a payload mast 112 that is strengthened and ruggedized for dual use as a mobility assist device. More particular, the payload module 112 may be mounted to the chassis 105 by a joint 600, illustrated in FIG. 6A-FIG. 6B, via a coupling shown in FIG. 8A and FIG. 8B. The position of the modular payload bay can be locked in position as shown in FIG. 8C.

Figure 6A:
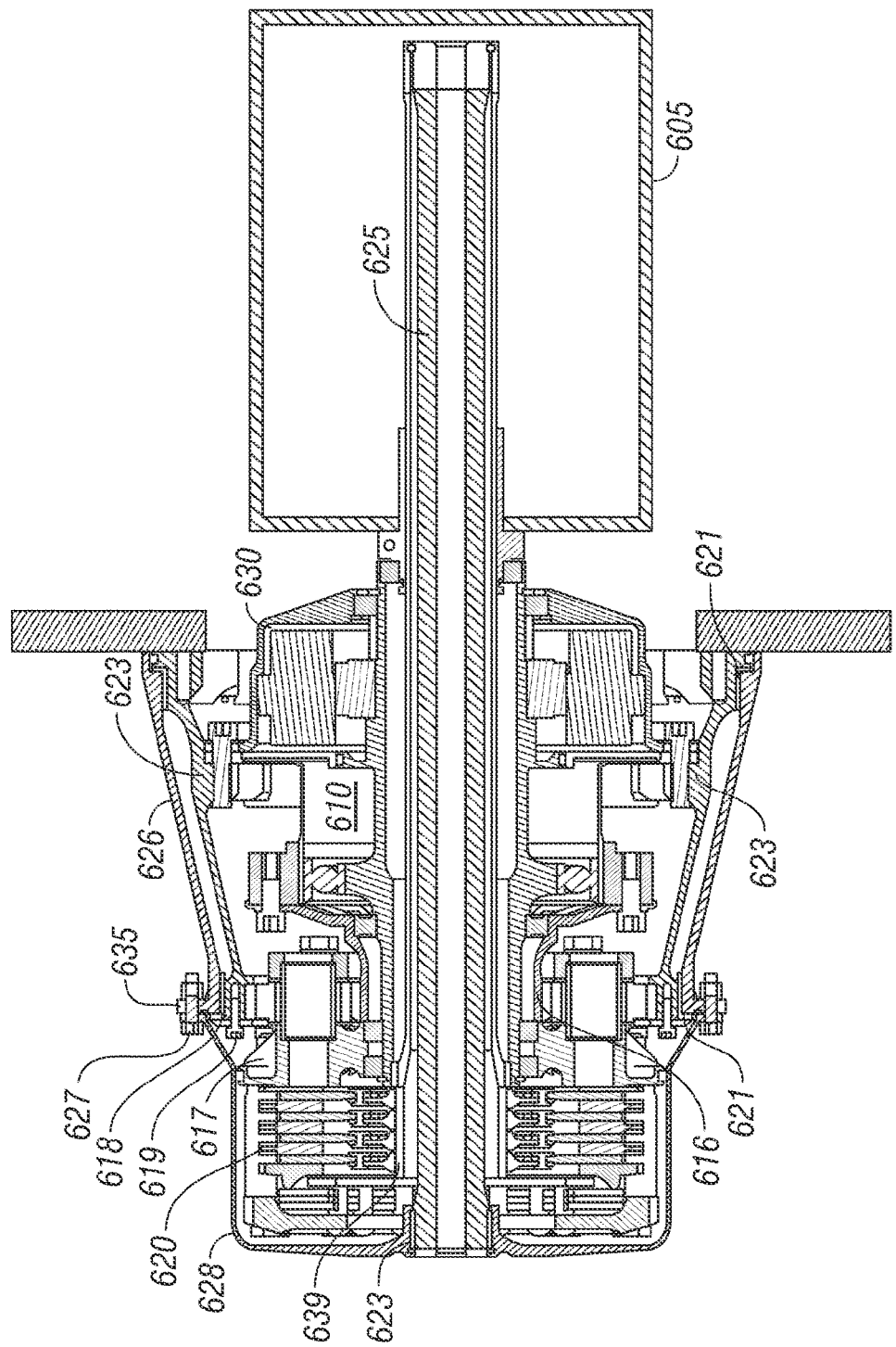
FIG. 6A-FIG. 6B detail one particular embodiment of the shoulder joint of the suspension system in FIG. 1 in an assembled, side, sectioned, plan view and in an exploded view, respectively.
Figure 6B:
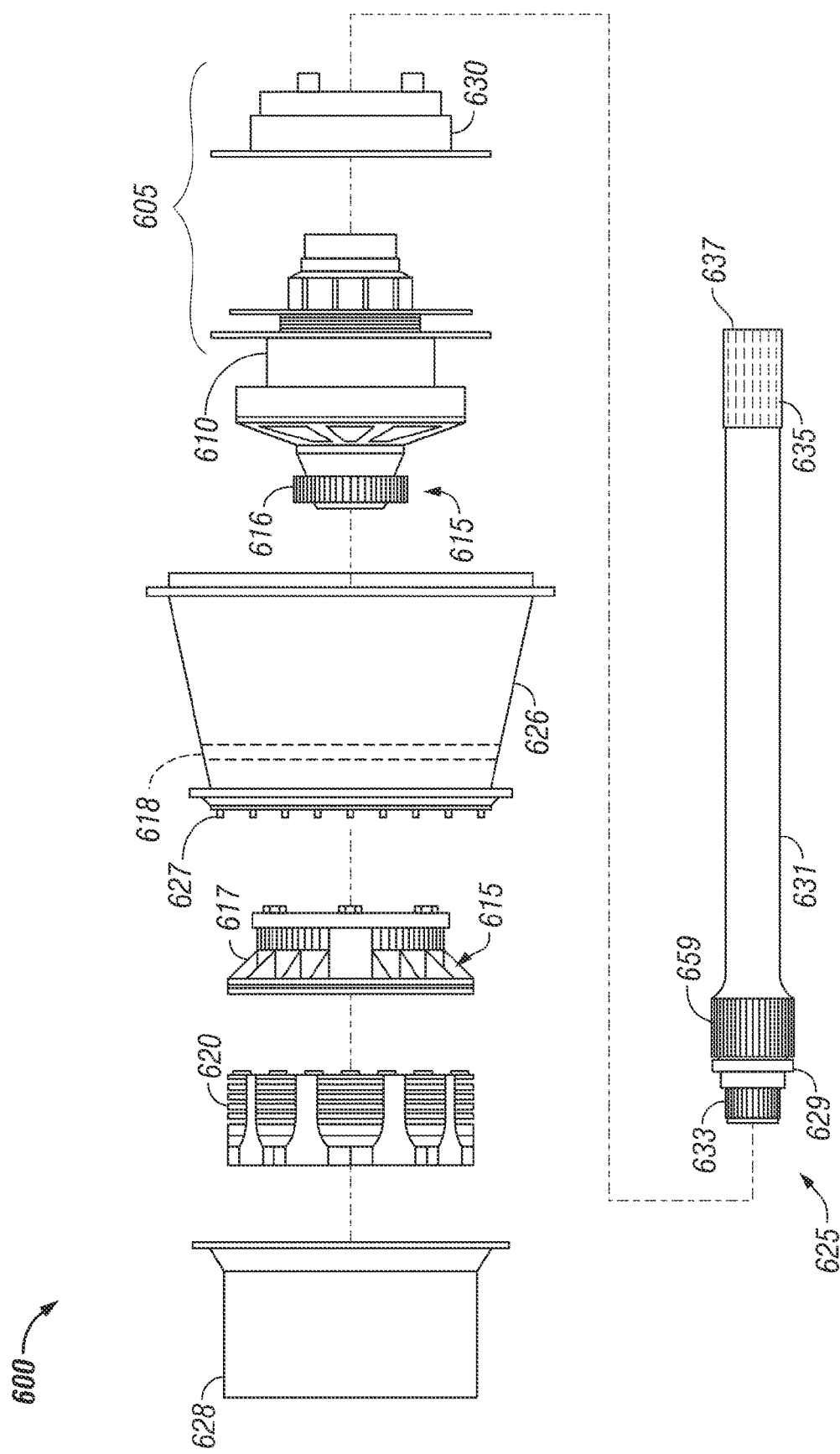

The payload module 112 is rotated by a joint 600 illustrated in FIG. 6A-FIG. 6B that rotates in plane via a motor/transmission package. As shown in FIG. 6A-FIG. 6B, the joint 600 comprises a drive 605, harmonic drive 610, planetary gear set 615, slip clutch 620, and torsion bar assembly 625 connected in series between the chassis 105 and the payload module 112 (both shown in FIG. 1). The planetary gear set 615 includes a sun gear 616 that engages a planetary gear 617 that, in turn, engages a ring gear 618 on the interior of the housing 626. The torsion bar assembly 625 includes an inner torsion bar 629 and an outer torsion bar 631. The inner torsion bar 629 includes on one end thereof a plurality of splines 633 that engage an end bell 628. The inner torsion bar 629 is nested within the outer torsion bar 631, and includes on the other end a plurality of splines 634 that engage the interior of an end 637 of the outer torsion bar 631. The outer torsion bar 631 also includes a plurality of splines 639 that engages the slip clutch 620.

The joint 600 also includes a housing 626 to which the suspension arm 304 is is attached. More particularly, the housing 626 is retained on a shoulder spindle 623 on the sleeve bearings 621 and a ring gear 619. The housing 626 is retained on the shoulder spindle 623 by a thrust retainer 635 secured by a plurality of fasteners 627. The housing 626 includes a plurality of bearings (not shown) on the inside thereof. The bearings interact with the planetary gear set 615 to rotate the housing 626 and, hence, the payload module 112. The joint 600 is capped, in the illustrated embodiment, by an end bell 628 to transmit torque between the torsion bar assembly 625 and the payload module 112 as well as to help protect the joint 600 from damage and debris.

Still referring to FIG. 6A-FIG. 6B, the drive 605 is, in the illustrated embodiment, an electric motor including a rotor 625 and a stator 630. The drive 605 can be co-aligned along the same axis of the shoulder 100, as in the illustrated embodiment. Alternatively, the drive 605 can be offset (not shown) and connected to the axis of actuation through a transmission, e.g., chain-driven. The drive 605 does not have to be electric, and can be a hydraulic, pneumatic, or a hybrid motor system. The drive 605 may comprise any type of drive known to the art, for example, a direct-drive motor, a servo motor, a motor-driven gearbox, an engine-driven gearbox, a rotary actuator, or the like. The drives 605 may be mechanically independent drives (i.e., not mechanically linked to each other). The shoulder motors 605 may be components of a power transmission system (e.g., a gearbox with clutched power take-offs) capable of operating each of the shoulder motors 605 independently.

The harmonic drive 610 and planetary gear set 615 implement a mechanical transmission. Some embodiments may also include a spur gear box, a traction drive, etc., in implementing a mechanical transmission. Mechanical transmissions have three primary applications in machine design: speed reduction, transferring power from one location to another, and converting motion from prismatic to rotary or vice versa. The joint 600 employs the mechanical transmission for speed reduction, which proportionally increases torque to rotate the payload module 112. For most moving parts, bearings are used to reduce friction and typically are designed in pairs to protect against radial, thrust, and moment loading on the actuator. Since the bearings transfer loads, the structure or housing of the shoulder actuator should be designed adequately to preclude structural failures and deflections. The harmonic drive 610 provides a first speed reduction and the planetary gear set 615 provides a second speed reduction.

The motor 605 and the transmission (i.e., the harmonic drive 610 and planetary gear set 615) may be considered the heart of the actuator for the joint 600. The remaining components facilitate the operation of the motor 605 and the transmission and may be omitted in various alternative embodiments (not shown). A clutch assembly (i.e., the slip clutch 620) may be integrated such that the linked wheel assembly 104 may be disengaged (not powered or controlled) where positioning is passive based only on gravity effects. The slip clutch 620 also limits the torque through the drive system and is capable of dissipating energy to prevent damage. Similarly, a torsion assembly (i.e., the torsion bar assembly 625) may be used to control the twist properties of the joint 600 by actively engaging different effective torsion bar lengths.

Thus, some embodiments may include the slip clutch 620 and/or the torsion bar assembly 625, whereas others may omit them. Furthermore, recent actuator development has shown the tendency to mount the motor servo-controller electronics close to the motor. If the drive 605 is brushless, the commutation sensor (not shown) and drive electronics (also not shown) could also be packaged in the actuator assembly. Thus, in some embodiments, the motor servo-controller electronics may comprise a portion of the joint 600. In the illustrated embodiment, the commutation sensors (not shown) are located in the stator.

Figure 7A:
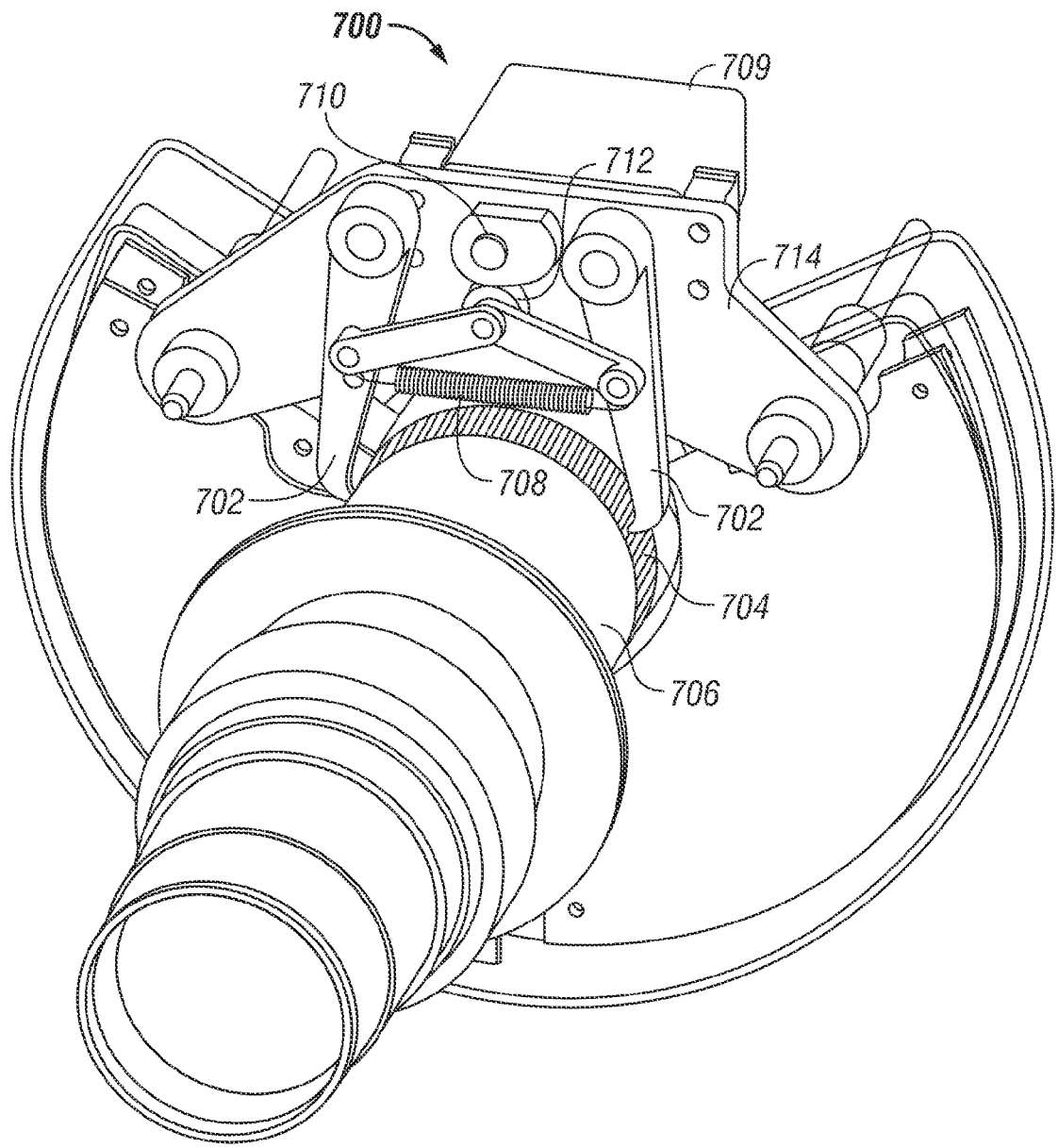
FIG. 7A-FIG. 7C illustrate a locking mechanism, a plurality of encoders, and a plurality of slip rings for the shoulder joint of the embodiment in FIG. 6A-FIG. 6B.
Figure 7B:
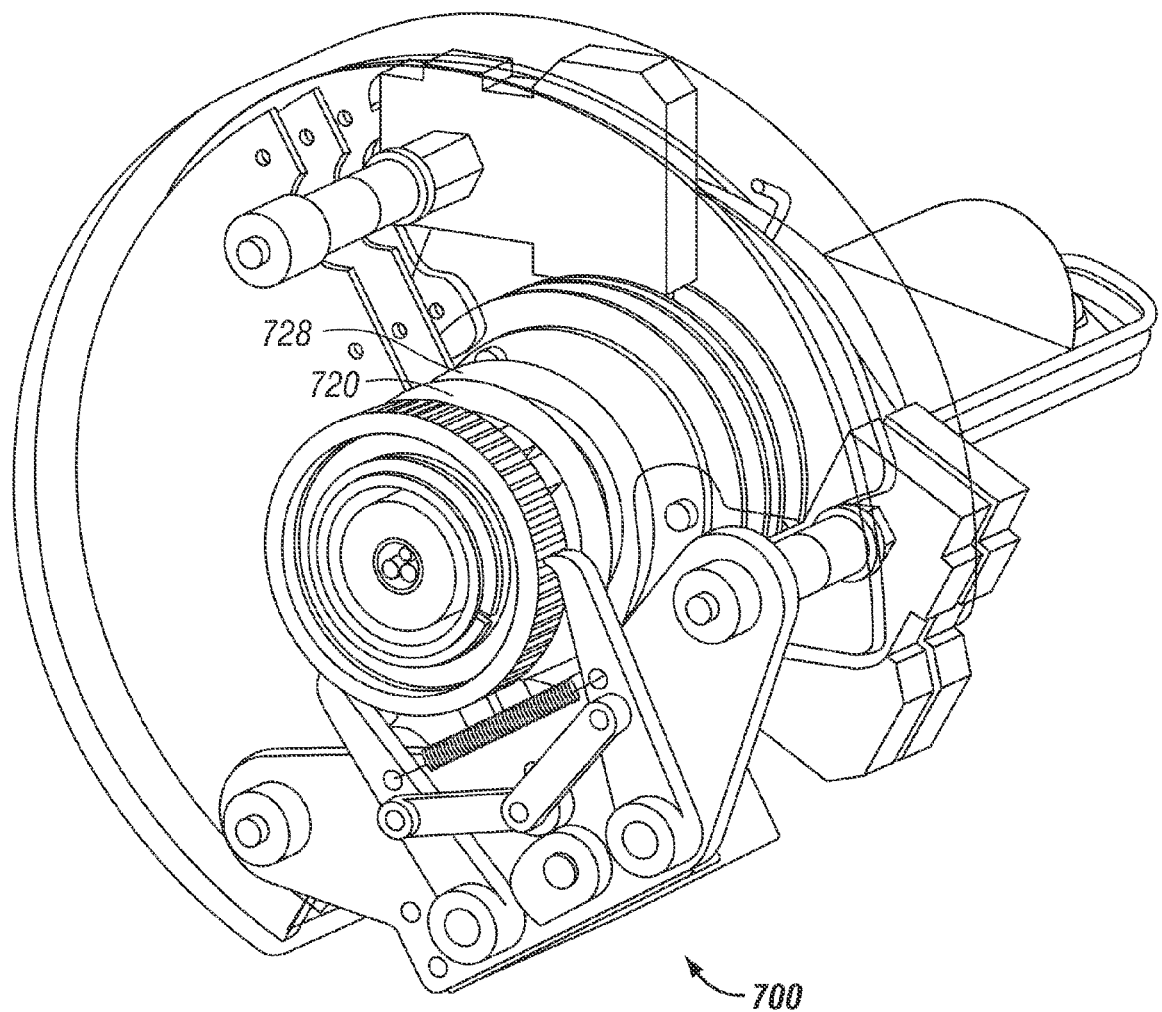

As is shown in FIG. 7A-FIG. 7B, a small spring applied, electrically released locking mechanism 700 prevents rotation of the motor so that power is not required when the vehicle 100 is static. The locking mechanism 700 does not require power to maintain its state. Power is only required to change states; that is to lock or unlock. Furthermore, no state change will occur after power failure. If the locking mechanism 700 is locked, it will remain locked in the event power fails. If the locking mechanism 700 is unlocked, it will remain unlocked upon loss of power.

More particularly, the locking mechanism 700 of the illustrated embodiment includes a pair of pawls 702 that interact with a toothed lock ring 704 on the motor shaft 706 of the drive 605. A spring 708, or some other biasing means, biases the pawls 702 to close on the lock ring 704 when the cam 710 is positioned by the servo-motor 709 to allow for movement of the driver 712 and linkage. To unlock the locking mechanism 700, the servo-motor 709 actuates the cam 710 to operate against driver 712 and open the pawls 702 away from the lock ring 704. Note that the pawls 702, the servo-motor 709, cam 710, and driver 712 are all mounted to a mounting plate 714 that is affixed to the chassis 105 (shown in FIG. 1). When the lock is engaged, no power is required. However, in some alternative embodiments, a spring applied brake may be used to facilitate locking the actuator shaft 706. In these embodiments, the locking mechanism 700 will still lock the joint 600 on power failure, but will consume power, when unlocked, as long as power is available.

FIG. 7B also illustrates a plurality of encoders. To know the absolute position of the joint 600, a position sensor such as a resolver, encoder, or potentiometer is used to measure for this information. The illustrated embodiment employs an position encoder 728 and a torsion bar twist encoder 720 to acquire data regarding the position of the payload module 112 and the twist on the torsion bar assembly 625, respectively. From this data, a control system (not shown) can determine the speed, reaction torque, and estimated load for the joint 600. Note that some embodiments may integrate a tachometer and calculate the same position data using simple calculus.

Figure 7C:
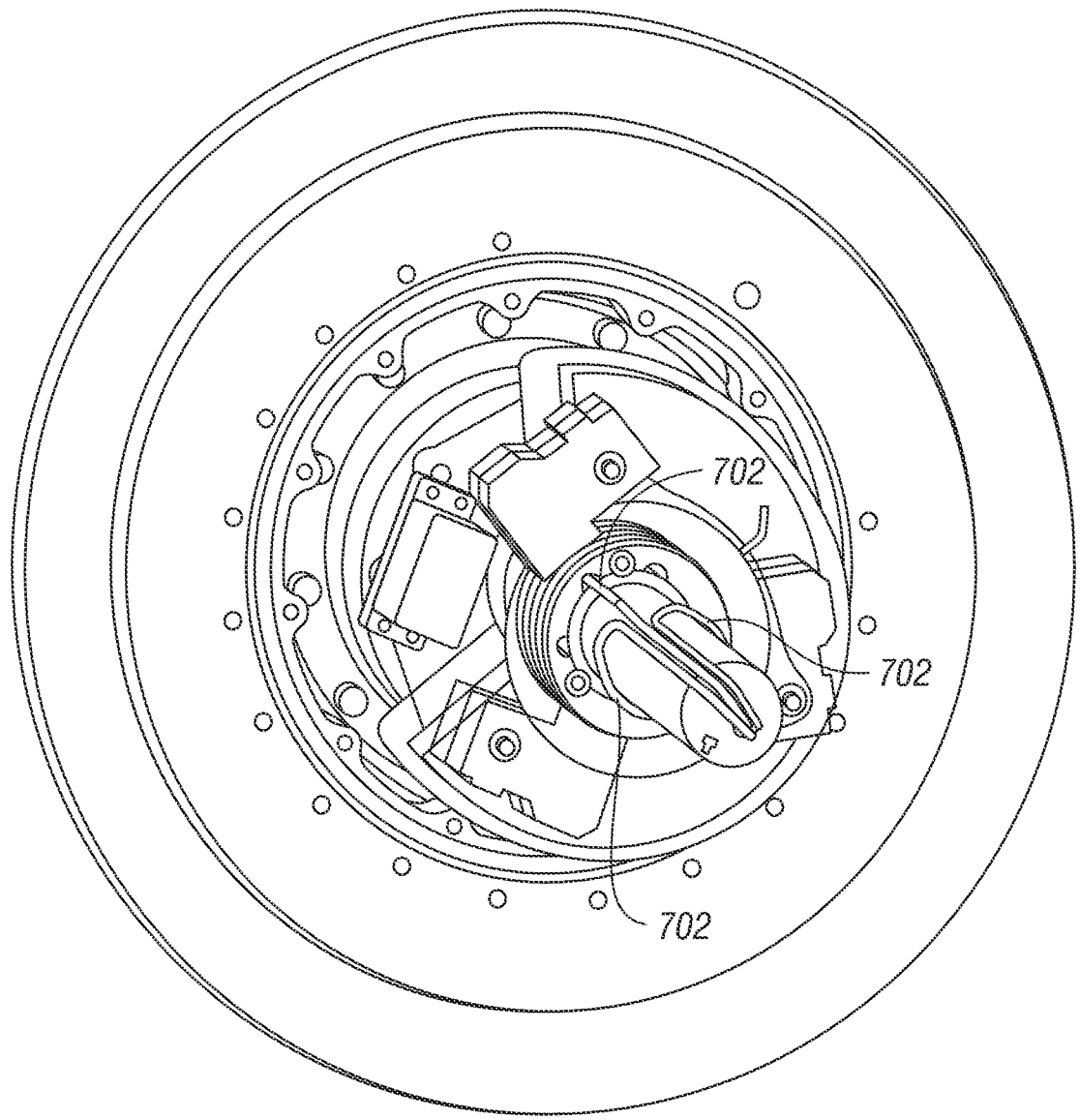

Returning to FIG. 6A-FIG. 6B, the drive 605, sensors (not shown), electronics (also not shown), and locking mechanism 700 all require power. Power is provided by the vehicle 100 (shown in FIG. 1) to the joint 600 and moreover, some power may be passed through from the vehicle chassis 105 through the joint 600 and to the payload module 112 to, for instance, power or control sensors stored therein. In addition to power, data signals follow the same path. To pass power and data signals over the rotary shoulder joints 100, a plurality of slip rings 732, shown in FIG. 7C are used. The supply of power should be isolated from data due to noise issues, and the illustrated embodiment employs separate slip rings to transmit power and data. Thus, the joint 600 also serves as an interface (structure, power, data pass thru, etc.) between the chassis 105 and the payload module 112 of the vehicle 100. Note that conductors (not shown) are attached to each side of the slip rings 732 with each side rotatably in contact with each other to maintain continuity.

Figure 8A:
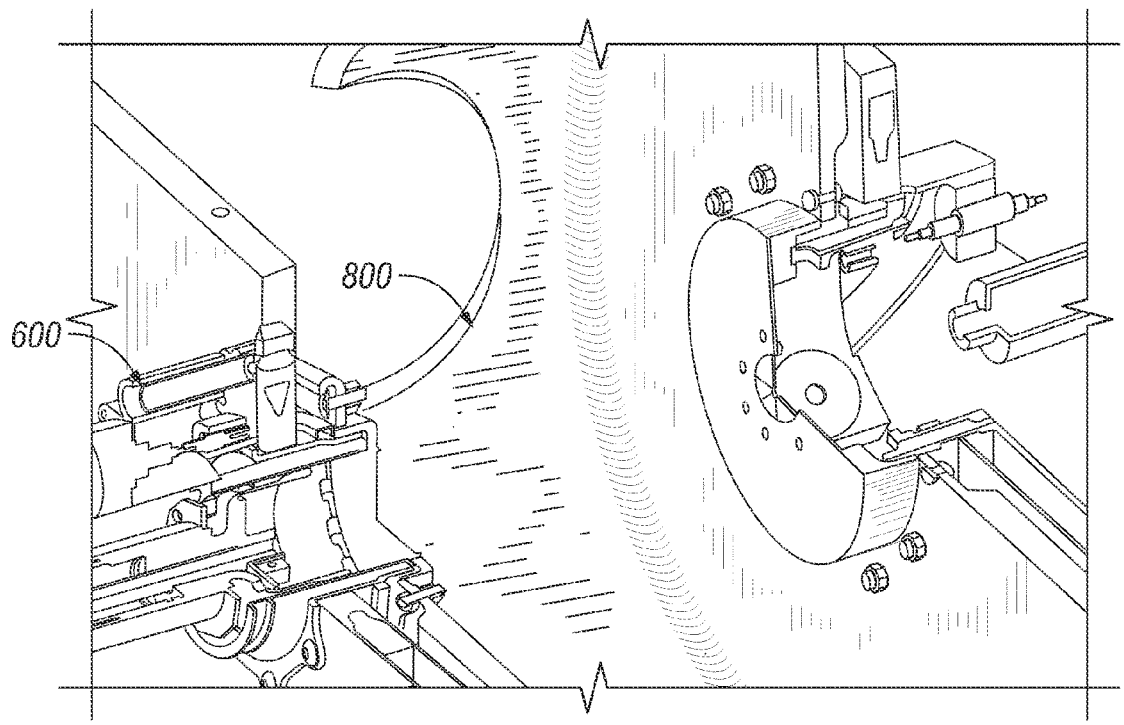
FIG. 8A-FIG. 8C illustrate selected aspects of the mechanical interface between the shoulder joint of FIG. 6A-FIG. 6B and the payload module of FIG. 2A-FIG. 2B.
Figure 8B:
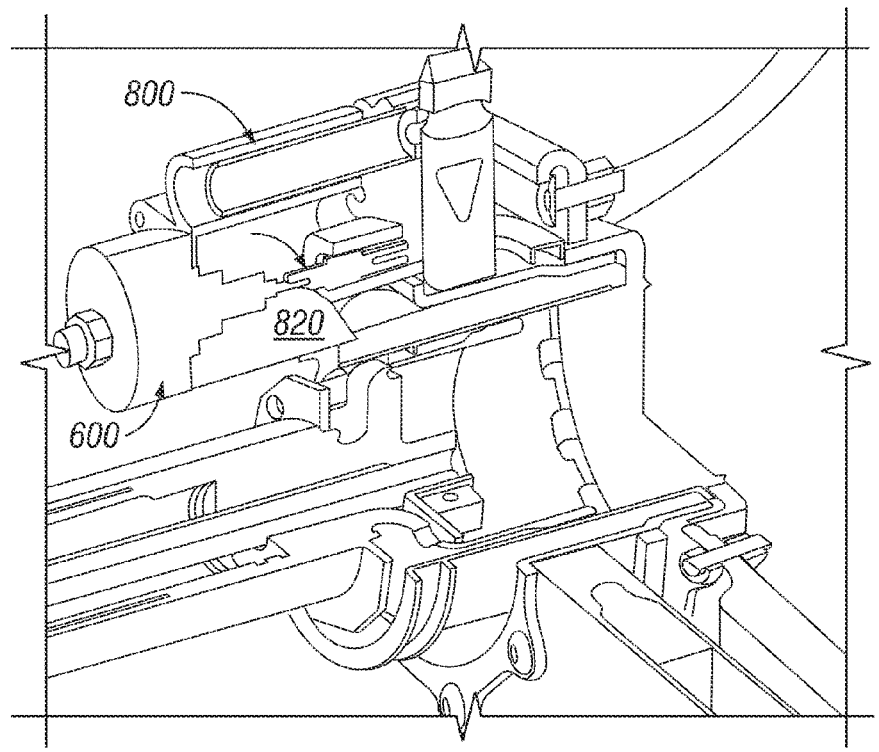
Figure 8C:
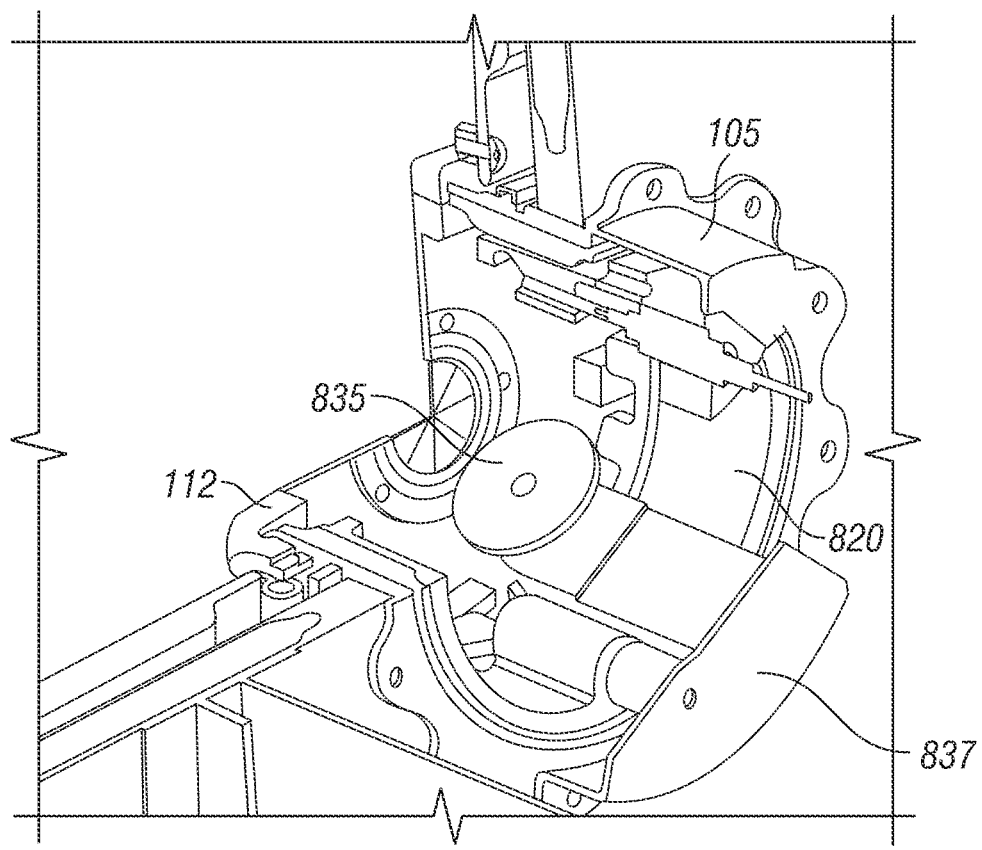

The joint 600, illustrated in FIG. 6A-FIG. 6B, interfaces with the payload module 112, illustrated in FIG. 2A and FIG. 2B, through a payload enclosure pivot 800, illustrated in FIG. 8A-FIG. 8C. The payload enclosure pivot 800 provides bearings and seals at the pivot and facilitates rotation of the payload module 112 through the coupling with the joint is 600. The payload enclosure pivot 800 employs a sliding dog clutch 820, best shown in FIG. 8B, to couple the payload module 112 to the joint 600. The payload enclosure pivot 800 includes a rotary encoder 835, best shown in FIG. 8C, positioned and supported by an alignment shaft 837 to provide locking and angle measurement. The sliding dog clutch in FIG. 8B couples the payload module to the torsion bar assembly of joint 600. The sliding dog clutch in FIG. 8C couples the payload module to the chassis in order to lock it in a fixed position so that it can be decoupled from the joint 600.

Figure 9:
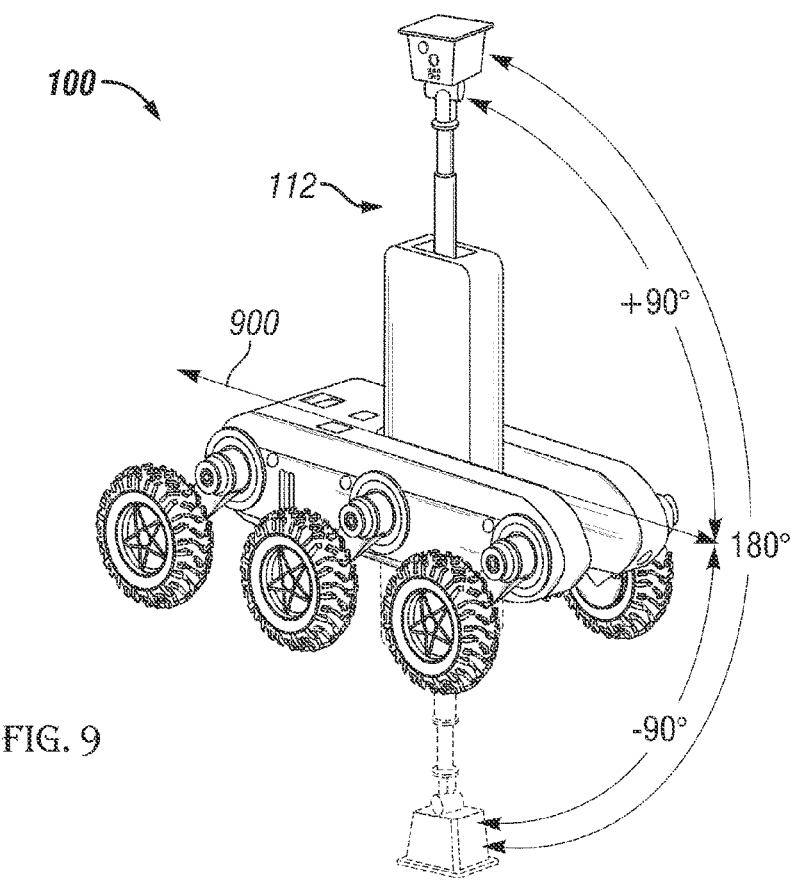
FIG. 9 illustrates the articulation of the payload module first shown in FIG. 1.

Turning now to FIG. 9, the payload module 112, through the operation of the joint illustrated in FIG. 6A-FIG. 6B, can be articulated through 180° of motion, as illustrated in ghosted lines, in the illustrated embodiment. In the illustrated embodiment, this 180° range is ±90° from the centerline 900 of the chassis 105. Note, however, that the range of motion is not material to the practice of the invention so long as it is sufficient to permit the payload module 112 to push against the ground. Thus, the range of motion may be greater or less than 180° and the full range of motion need not be symmetric about the centerline 900 of the chassis 105.

As those in the art having the benefit of this disclosure will appreciate, objects in the environment may restrict the range of articulation. For instance, the vehicle 100 will typically be on a ground surface that will restrict this range of motion through −90°, as will be discussed more fully below. Also, if the vehicle 100 is positioned under a ceiling, roof, or overhang, such a structure may also limit the range of motion through +90°. Note, however, that not all embodiments require a full range of 180° of motion, nor will this range of motion be centered on the centerline 900 of the chassis. The payload module 112 in some embodiments might, for instance, be capable of only −90° of motion relative to the centerline 900.

Figure 10:
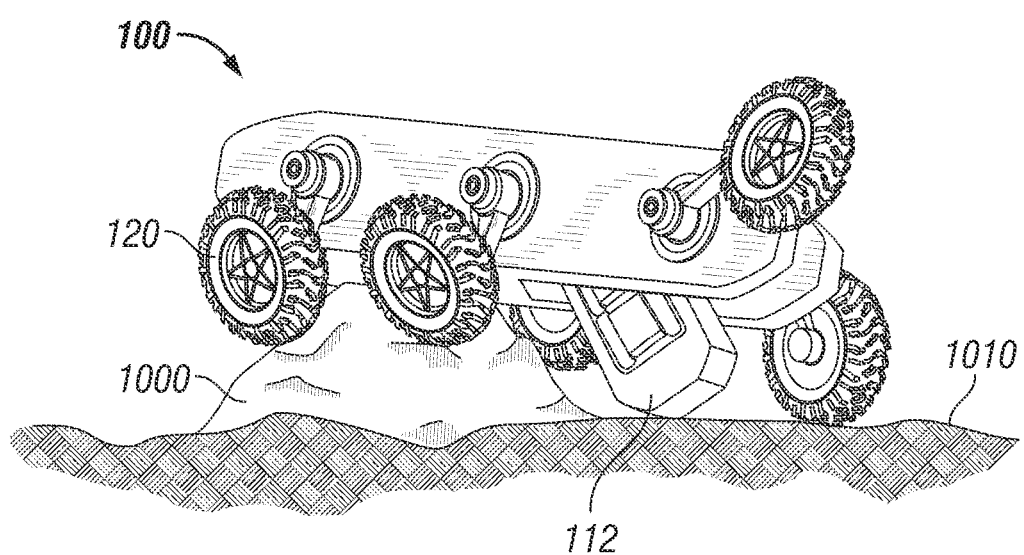
FIG. 10 depicts one scenario in which the payload module is articulated to assist in the mobility of the vehicle.

The payload module 112 can be articulated as shown in FIG. 9 to assist in the mobility of the vehicle 100 in a number of ways. One primary technique is illustrated in FIG. 10, wherein the vehicle 100 has become centered on an obstacle 1000. The vehicle 100, either under onboard software control or remote human control, articulates the payload module 112 to push off the ground 1010 until the wheels 120 (only one indicated) can touch the ground 1010. Thus, the ability to articulate the payload module 112 eliminates, or at least reduces, high centering on obstacles by dual use of the centralized payload section and providing articulation through 180° to allow pushing off of obstacles until the wheels 120 gain traction again. Still other techniques may become apparent to those skilled in the art having the benefit of this disclosure.

Thus, returning to FIG. 1, the invention includes a ruggedized payload module 112 for mobility assist that eliminates, or at least reduces, high centering on obstacles by dual use of a centralized payload section by providing articulation to allow pushing off of obstacles, as shown in FIG. 10, until the wheels 120 gain traction again. The payload module 112 interfaces with the chassis 105 of the vehicle 100 through a coupling device that allows for articulation of the payload module 112 via the center joint 600, shown in FIG. 6A-FIG. 6B.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus comprising an articulable payload module coupling, wherein the articulable payload module coupling includes:
    a splined, sliding dog clutch; and
    a motor.
2. An apparatus comprising an articulable payload module coupling, wherein the articulable payload module coupling includes:
    a splined, sliding dog clutch;
    a motor; and
    rotary encoder.
3. An apparatus comprising an articulable payload module coupling, the articulable payload module coupling including a rotary encoder.

* * * * *